United States Patent [19]

McEwan

[11] Patent Number: 5,757,320
[45] Date of Patent: May 26, 1998

[54] SHORT RANGE, ULTRA-WIDEBAND RADAR WITH HIGH RESOLUTION SWEPT RANGE GATE

[75] Inventor: Thomas E. McEwan, Livermore, Calif.

[73] Assignee: The Regents of the University of California, Oakland, Calif.

[21] Appl. No.: 769,033

[22] Filed: Dec. 17, 1996

Related U.S. Application Data

[63] Continuation of Ser. No. 359,151, Dec. 19, 1994, abandoned, which is a continuation-in-part of Ser. No. 300,909, Sep. 6, 1994, Pat. No. 5,510,800, which is a continuation-in-part of Ser. No. 58,398, May 7, 1993, Pat. No. 5,457,394, which is a continuation-in-part of Ser. No. 44,745, Apr. 12, 1993, Pat. No. 5,345,471.

[51] Int. Cl.$^6$ ........................................ G01S 1/24
[52] U.S. Cl. ................ 342/387; 342/22; 342/94; 342/137; 342/91; 342/95
[58] Field of Search .................... 342/94, 136, 137, 342/91, 95, 22

[56] References Cited

U.S. PATENT DOCUMENTS

| | | | |
|---|---|---|---|
| 3,278,843 | 10/1966 | Deming | 324/61 |
| 3,569,971 | 3/1971 | Griffee | 343/725 |
| 3,710,387 | 1/1973 | Hinchman et al. | 343/12 R |
| 3,720,950 | 3/1973 | Vehrs | 343/17.2 |
| 3,721,978 | 3/1973 | Doggett | 343/7 A |
| 3,750,125 | 7/1973 | Ross et al. | 340/258 C |
| 3,828,348 | 8/1974 | Murray | 343/7 A |
| 3,858,205 | 12/1974 | Ross | 343/7 ED |
| 3,967,282 | 6/1976 | Young et al. | 343/5 NA |
| 3,971,990 | 7/1976 | Ross | 325/400 |
| 3,996,589 | 12/1976 | Breese | 343/8 |
| 4,003,051 | 1/1977 | Fitzgerald et al. | 343/7.7 |
| 4,015,264 | 3/1977 | Koerner | 343/725 |
| 4,041,382 | 8/1977 | Washburn | 324/65 R |
| 4,063,238 | 12/1977 | Conner | 343/7.3 |
| 4,067,225 | 1/1978 | Dorman et al. | 73/1 DV |
| 4,068,233 | 1/1978 | Pease et al. | 343/7.7 A |
| 4,072,942 | 2/1978 | Alongi | 343/51 VA |
| 4,086,528 | 4/1978 | Walton | 324/61 R |
| 4,087,754 | 5/1978 | Song | 325/38 B |
| 4,125,835 | 11/1978 | Barry | 343/13 R |
| 4,126,860 | 11/1978 | Sullivan et al. | 343/5 NA |
| 4,130,796 | 12/1978 | Shum | 324/61 R |
| 4,322,678 | 3/1982 | Capots et al. | 324/61 |
| 4,430,653 | 2/1984 | Coon et al. | 353/5 NA |
| 4,464,622 | 8/1984 | Franklin | 324/67 |
| 4,504,833 | 3/1985 | Fowler et al. | 343/5 NA |
| 4,538,149 | 8/1985 | Wehner | 343/17.2 R |
| 4,676,100 | 6/1987 | Eichberger | 73/304 |

(List continued on next page.)

FOREIGN PATENT DOCUMENTS

WO 94/06121  9/1993  WIPO.

Primary Examiner—Thomas H. Tarcza
Assistant Examiner—Dao L. Phan
Attorney, Agent, or Firm—Henry P. Sartorio

[57] ABSTRACT

A radar range finder and hidden object locator is based on ultra-wide band radar with a high resolution swept range gate. The device generates an equivalent time amplitude scan with a typical range of 4 inches to 20 feet, and an analog range resolution as limited by a jitter of on the order of 0.01 inches. A differential sampling receiver is employed to effectively eliminate ringing and other aberrations induced in the receiver by the near proximity of the transmit antenna, so a background subtraction is not needed, simplifying the circuitry while improving performance. Uses of the invention include a replacement of ultrasound devices for fluid level sensing, automotive radar, such as cruise control and parking assistance, hidden object location, such as stud and rebar finding. Also, this technology can be used when positioned over a highway lane to collect vehicle count and speed data for traffic control.

76 Claims, 7 Drawing Sheets

U.S. PATENT DOCUMENTS

| | | | |
|---|---|---|---|
| 4,698,634 | 10/1987 | Alongi et al. | 343/5 NA |
| 4,706,031 | 11/1987 | Michiguchi et al. | 324/337 |
| 4,728,897 | 3/1988 | Gunton | 324/329 |
| 4,728,953 | 3/1988 | Richmond | 342/91 |
| 4,743,906 | 5/1988 | Fullerton | 342/27 |
| 4,847,552 | 7/1989 | Howard | 324/67 |
| 4,853,617 | 8/1989 | Douglas et al. | 324/67 |
| 4,896,116 | 1/1990 | Nagashima et al. | 324/329 |
| 4,905,008 | 2/1990 | Kawano et al. | 342/22 |
| 4,937,580 | 6/1990 | Wills | 342/22 |
| 4,979,186 | 12/1990 | Fullerton | 375/23 |
| 4,992,741 | 2/1991 | Douglas et al. | 324/671 |
| 5,023,484 | 6/1991 | Pathak et al. | 307/465 |
| 5,089,704 | 2/1992 | Perkins | 250/342 |
| 5,148,175 | 9/1992 | Woolfolk | 342/95 |
| 5,180,969 | 1/1993 | Kwun et al. | 324/71.2 |
| 5,196,826 | 3/1993 | Whiting | 340/554 |
| 5,274,271 | 12/1993 | McEwan | 307/108 |
| 5,332,938 | 7/1994 | McEwan | 307/572 |
| 5,352,974 | 10/1994 | Heger | 324/67 |
| 5,361,070 | 11/1994 | McEwan | 342/21 |
| 5,363,108 | 11/1994 | Fullerton | 342/27 |
| 5,420,589 | 5/1995 | Wells et al. | 342/22 |
| 5,457,394 | 10/1995 | McEwan | 324/642 |
| 5,512,834 | 4/1996 | McEwan | 324/642 |
| 5,541,605 | 7/1996 | Heger | 342/85 |
| 5,543,799 | 8/1996 | Heger | 342/85 |

SHORT RANGE, ULTRA-WIDEBAND RADAR WITH HIGH RESOLUTION SWEPT RANGE GATE

CONTINUING APPLICATION DATA

This is a Continuation of application Ser. No. 08/359,151 filed Dec. 19, 1994, abandoned, which is a continuation-in-part (CIP) of application Ser. No. 08/300,909 filed Sep. 6, 1994, now U.S. Pat. No. 5,510,800, issued Apr. 23, 1996, which is a continuation-in-part (CIP) of application Ser. No. 08/058,398 filed May 7, 1993, now U.S. Pat. No. 5,457,394, issued Oct. 10, 1995, which is a continuation-in-part (CIP) of application Ser. No. 08/044,745 filed Apr. 12, 1993, now U.S. Pat. No. 5,345,471, issued Sep. 6, 1994.

The United States government has rights in this invention pursuant to Contract Number W-7405-ENG-48 between the United States Department of Energy and the University of California for the operation of Lawrence Livermore National Laboratory.

BACKGROUND OF THE INVENTION

1. Field of the Invention

The present invention relates to high resolution, short range radar systems, and more particularly to ultra-wide band radars for imaging short range fields.

2. Description of Related Art

Short range finding applications in the prior art have typically been implemented using either ultrasound technology, or frequency modulated continuous wave (FMCW) radar. For instance, range finding used in fluid level sensors for large tanks in the prior art have involved FMCW radar level sensing. However, this technology, which relies on measuring changes in the beat frequencies detected for transmitted and received waves, requires very linear voltage controlled oscillators at microwave frequencies. This technology is very tough to implement with the precision desired in level sensing technology. Thus, prior art FMCW radars have been limited in resolution to several inches and are relatively expensive.

Another technology used in level sensing is ultrasound. However, ultrasound technology suffers a number of disadvantages. In particular, for fluid level sensors, the ultrasound may erroneously pick up a level of foam, rather than a level of actual liquid. Also, it does not penetrate vapors, like gasoline or steam, which may be trapped in a tank. Furthermore, any soil on the sensors will prevent its operation. Also, ultrasound is inherently difficult to use for precision measurements, because the speed of sound varies with temperature and humidity by as much as 10% in normal operating conditions.

Accordingly, it is desirable to provide a range finding system, or imaging system which operates over a short range, has low cost, and provides excellent accuracy.

SUMMARY OF THE INVENTION

The present invention provides a radar range finder and hidden object locator based on ultra-wide band radar with a high resolution swept range gate. The device generates an equivalent time amplitude scan with a typical range of 1 inch to 20 feet, and an analog range resolution as limited by a jitter of on the order of 0.01 inches. A differential sampling receiver is employed to effectively eliminate ringing and other aberrations induced in the receiver by the near proximity of the transmit antenna, so a background subtraction is not needed, simplifying the circuitry while improving performance. Uses of the invention include a replacement of ultrasound devices for fluid level sensing, automotive radar, such as cruise control and parking assistance, and hidden object location, such as stud and rebar finding. Also, this technology can be used when positioned over a highway lane to collect vehicle count and speed data for traffic control.

The invention can be characterized as an apparatus for detecting characteristics of objects within a field. The apparatus comprises a transmitter which transmits the sequence of electromagnetic pulses in response to a transmit timing signal. A receiver samples echoes of the sequence of electromagnetic pulses which are generated by objects within the field. The receiver samples these echoes using a differential sampling receiver having a transformerless differential input with high common mode rejection which reduces ground currents coupled from the transmit pulse through the apparatus structure. In response to the samples, a sample signal is generated which provides an equivalent time representation of the echoes being received. A timing circuit supplies the transmit timing signal to the transmitter and the receive timing signal to the receiver. The receive timing signal causes the receiver to sample the echoes such that the time between transmission of pulses in the sequence and sampling by the receiver sweeps over a range of delays. A sample detection circuit is responsive to the sample signal and the timing circuit to indicate a distance between the transmitter and the objects in the field from which the echoes are reflected.

The delay in the range of delays over which the timing circuit sweeps the time between transmission of pulses and sampling of the receiver defines the range of the device. According to the present invention, this range may vary by less than 100 nanoseconds, or more particularly by less than 10 nanoseconds in some systems. The time between pulses transmitted by the transmitter should be as long as or longer than the range of delays over which the sampling is swept.

Thus, the transmit timing signal causes the transmitter to transmit a sequence of electromagnetic pulses at a pulse repetition rate, and the receive timing signal sweeps over the range of delays in a sweep cycle such that echoes are sampled at the pulse repetition rate and with different delays in the range of delays. This produces a sample signal representing magnitude of the received echoes in equivalent time.

The pulse repetition rate may be, for example, greater than about 1 megaHertz, and the sweep rate less than about 16 kiloHertz, which is the frequency of NTSC video. More preferably, the sweep cycle may sweep at a sweep rate of less than 100 Hertz, for instance, 40 Hertz.

According to one aspect of the invention, the receiver includes waveguide cavities for the transmit and receive antennas. The antennas comprise AC coupled monopoles with resistive loading formed within the respective cavities.

The receiver, according to another aspect of the invention, includes a receive antenna within a waveguide receive cavity. First and second diode sampling gates are mounted within the receive cavity and connected to the receive antenna. The diode sampling gates are pulsed by the receive timing signal, and feed the inputs of the differential amplifier. The output of the differential amplifier provides the sample signal in equivalent time.

Accordingly, a wide band radar with high resolution, and having a swept range gate has been provided which operates in the near field. It overcomes all of the deficiencies of prior art ultrasound range finders, and is much more accurate and easier to implement than the FMCW radar used in these types of applications.

The present invention achieves an extraordinary level of ringing and close-in clutter suppression. At ranges further than four inches from the sensor, ringing and clutter are 30 dB lower than a strong return echo. Most prior art attempts to build close range wide band radar result in just the opposite effect, that is, ringing and clutter are 30 dB stronger than the received echo, and a background subtraction technique had to be applied. Having to include a background subtract technology in the radar greatly reduces the dynamic range and stability, and complicates the circuitry.

Other aspects and advantages of the present invention can be seen upon review of the figures, the detailed description, and the claims which follow.

DETAILED DESCRIPTION OF PREFERRED EMBODIMENTS

Figure 1:
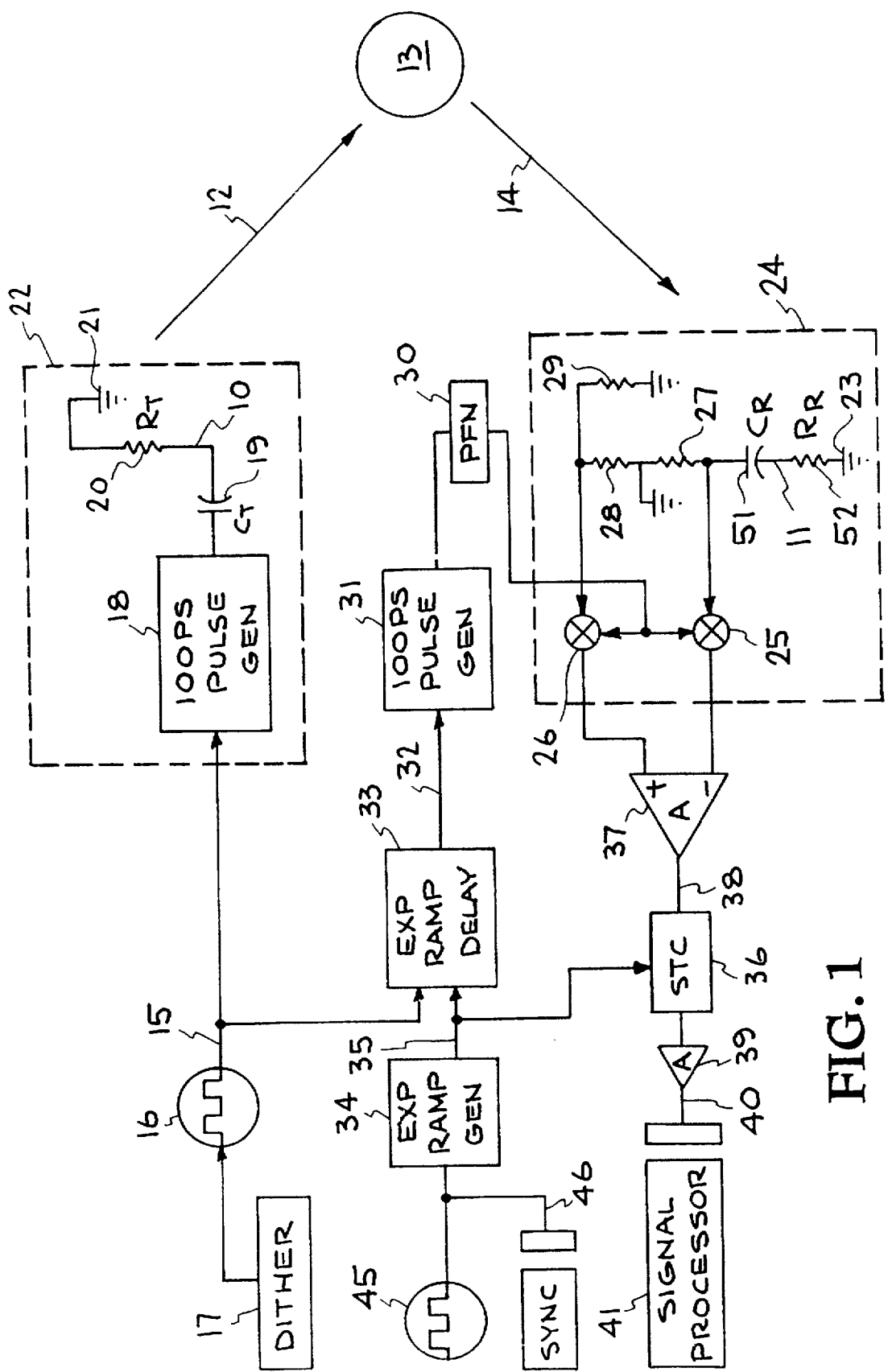
FIG. 1 is a block diagram of the wide band radar according to the present invention.

A detailed description of preferred embodiments of the present invention is provided with respect to the figures, in which FIG. 1 provides a block diagram of the sensor.

As can be seen in FIG. 1, the radar includes a one and one-quarter inch monopole antenna 10 for the transmitter, and a one and one-quarter inch monopole antenna 11 for the receiver. The transmit antenna is used to transmit a sequence of electromagnetic pulses, generally 12. Electromagnetic pulses echo off an object or target 13 within the field of the sensor. The echoes, generally 14, are received by the receive antenna 11.

The sequence of electromagnetic pulses are generated in response to a transmit clock on line 15. The transmit clock is supplied by a pulse repetition frequency generator 16, nominally at 2 megaHertz in this example. This pulse repetition frequency generator may be dithered using a dithering mechanism 17 if desired for noise immunity in the sensor. The transmit clock on line 15 drives a 100 picosecond pulse generator 18 (e.g. a transistor) which is coupled to the antenna 10 through a capacitor 19. The antenna 10 is a resistively loaded monopole antenna, having a transmit load resistor 20 coupled to a ground plane 21.

As schematically illustrated in the figure, the pulse generator 18 and antenna 10 are mounted within a waveguide cavity 22, providing shielding from other components on the sensor, and causing the electromagnetic pulses 12 to be issued in a forward direction, with limited back lobe generation.

The receive antenna 11 is coupled to a first high speed sample gate 25, and a second high speed sample gate 26. The antenna is connected from the input of the sample gate 25 to ground across a resistor 27, and the input of sample gate 26 is connected from ground across resistor 28. Also, a trim resistor $R_{TRIM}$ 29 is connected from the input of sample gate 26 to ground. Antenna 11 is a capacitively and resistively loaded monopole antenna, having a transmit load capacitor 51 and a series transmit load resistor 52 coupled to a ground plane 23. The antenna 11 and associated components and sample gates 25, 26 are mounted within a waveguide cavity 24.

The sample gates are strobed using a pulse forming network 30 driven by a 100 picosecond pulse generator 31 (e.g. transistor). The 100 picosecond pulse generator is controlled by a receive timing clock on line 32. The receive timing clock is swept over a range of delays by an exponential ramp delay circuit 33. The input to the ramp delay circuit is the transmit clock on line 15. The sweep of the ramp delay circuit 33 is controlled by an exponential ramp generator 34 which is coupled across line 35 to the ramp delay circuit 33. The ramp on line 35 also drives a sensitivity time controller 36.

The sample gates 26 and 25 are coupled to differential amplifier 37. The output of the differential amplifier 37 is supplied on line 38 as an input to the sensitivity time controller. This sensitivity time controller compensates for the magnitude of the echoes received as the range of the echo increases.

The output of the sensitivity time controller is supplied to amplifier 39 which supplies a range normalized equivalent time signal on line 40 representing the echoes being received. The sample signal on line 40 is supplied to a signal processor 41 for indicating a characteristic of the target 13 in response to the sample signal.

The exponential ramp generator 34 is controlled by a range sweep generator 45, nominally at 40 Hertz in this example. Also, the 40 Hertz range sweep generator 45 is used to supply a sync signal 46 which is used by the signal processor 41, and otherwise for control purposes in the network.

Thus, the pulse repetition frequency generator 16 drives a transmit pulse generator 18 which supplies a 100 picosecond step to a resistively loaded, cavity backed, monopole antenna 10. The range delay path includes an exponential voltage ramp circuit 34 providing a real time range sweep circuit with, for example, a 0 to 10 nanosecond sweep range. An equivalent time exponential ramp circuit 34 is used for reference, such that the two exponentials track, forming a range sweep that is very linear in time. The exponential voltage ramp circuit is extremely simple, stable, and low cost, providing nanosecond speed sweep circuits. The range is swept at 40 Hertz in the example, and the 40 Hertz sync pulse is provided to trigger a monitor scope or digitizer used by the signal processor 41. The delay circuit drives a fast transistor to provide a gate pulse to the receive sampler. The receive sampler has a transformerless differential input with a high common mode rejection. Differential operation is used to reduce ground currents coupled from the transmit pulse through the sheet inductance of the ground plane. The equivalent time exponential ramp also drives a sensitivity time control 36 that maintains constant amplitude output pulses regardless of range to the target. The STC circuit employs FETs as attenuators that scale according to the range ramp voltage as modified by a range modelling circuit in the STC. A separate signal attenuator and range modelling attenuator FETs are forced to track with high precision through a servo loop.

The absolute accuracy of the system is limited by drift in the gate delays and the components used to implement the radar. One source of such drift is the ramp generator. An alternative system for causing the swept delay could be based on tuned quartz oscillators. A first quartz oscillator used for the pulse repetition frequency generator is set at the desired frequency, such as 2 megaHertz. The second tuned quartz oscillator could be set at pulse repetition frequency less the sweep frequency of 40 Hertz (2 megaHertz–40 Hertz). The second sample gate repetition frequency generator would drive the pulse generator in the pulse forming network to strobe the receive sample gates. The 40 Hertz oscillator for synchronizing the signal processor would be triggered by coincidence of the rising edge of the transmit pulse repetition frequency generator, and the receive pulse generator. Because of the stability possible for quartz generators, the drift in the receive and transmit timing signals could be precisely controlled.

The dithering of the pulse repetition frequency generator provides noise immunity with similar systems in the same field. Thus, a number of systems could be positioned as desired at different spatial locations to provide imaging capabilities and synthetic beam forming for narrow beam applications.

Figure 2:
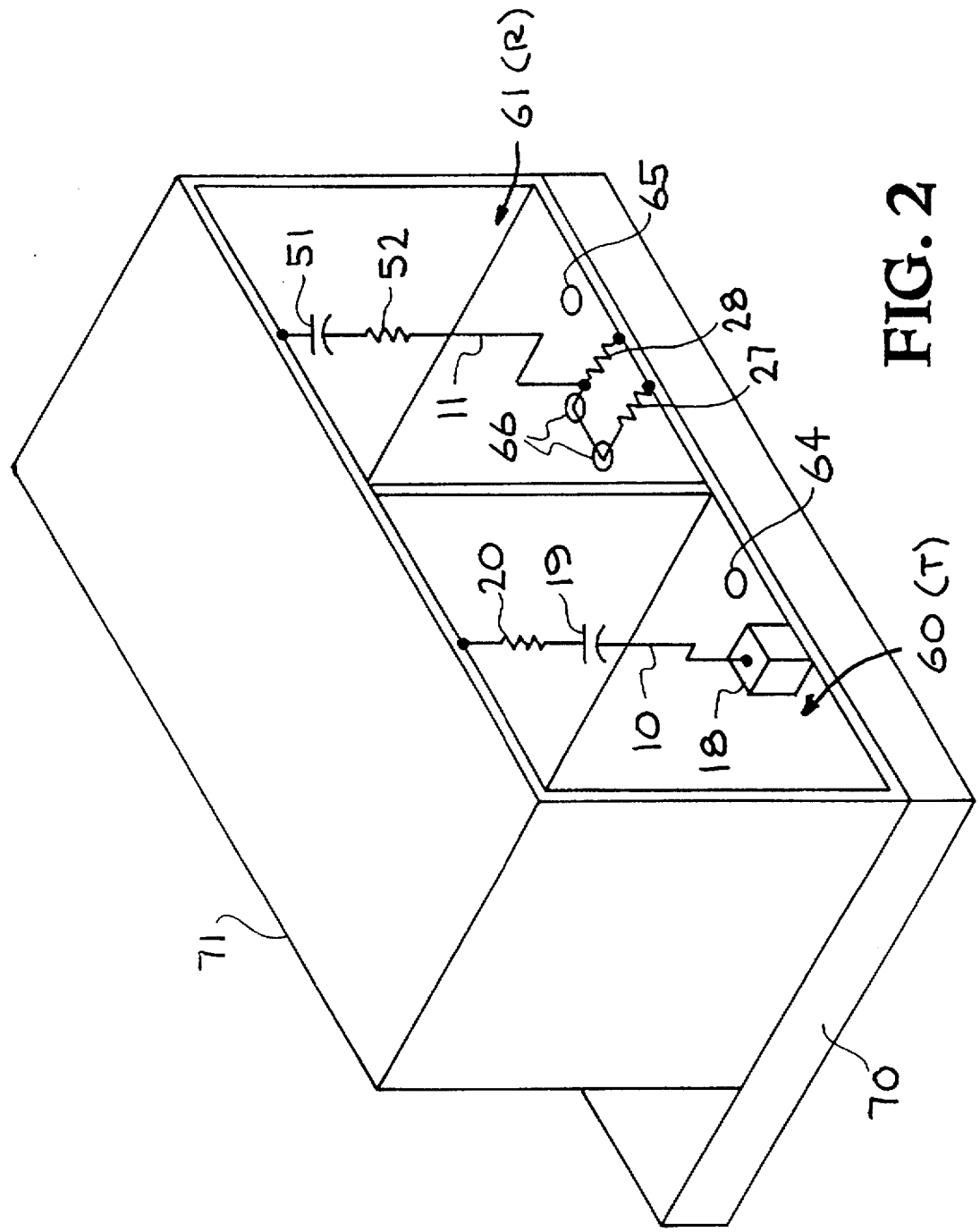
FIG. 2 illustrates the waveguide cavities and antenna configuration of one embodiment of the present invention.

FIG. 2 depicts the physical arrangement of the antennas and the differential sampler. The transmit and receive antennas are enclosed in adjacent cavities, the T cavity 60 and the R cavity 61. Thus, the monopole antenna 10, including the capacitor 19 and load resistor 20 are mounted within a 1½ inch high transmit cavity 60. Also, the transmit pulse generating transistor 18 is mounted within the cavity. A drive feed hole 64 is formed in the transmit cavity 60 through which the electronics communicate.

The receive cavity 61 also includes a strobe feed hole 65 through which the electronics are coupled to the pair of samplers 66 for the receiver. The resistors 27 and 28 are mounted within the receive cavity. Also, the antenna consisting of the load resistor 52 and load capacitor 51 on the monopole 11 are mounted across the 1½ inch high receive cavity 61.

The transmit cavity and the receive cavity are mounted on a shielding box 70, and all circuitry except the items in the transmit and receive cavities are mounted under the shield.

The AC coupling of the resistively loaded monopole antennas 10 and 11 perform different functions. For the transmit antenna 10, the capacitor 19 prevents biasing on the pulse generating transistor 18 from being shunted to ground. The capacitor 51 on the receive antenna prevents residual low frequency currents from the transmit pulse from being coupled into the antenna 11 via the shield.

The transmit and receive cavities are all metal, or metal coated waveguide cavities with an enclosed back 71 which prevents back lobe creation by the transmit antenna, and improves the directional characteristic of the transmitter. With this configuration, the transmitted pulse will propagate with a field of view of about 150° with less than 3 dB attenuation relative to the main lobe. The back lobe generation will be much smaller.

As mentioned above, the cavities are waveguide cavities, and such are preferably designed with the center frequency of the pulses in mind, to operate as a lossless waveguide. In the embodiment described, the approximate dimensions are 1½ inches high, 1½ inches deep, and 1¾ wide, for both the receive cavity 61 and the transmit cavity 60. The base in the example illustrated is 3½ inches deep, ½ inch high, and 3½ inches wide.

Note that the gate pulse generator is underneath the shielding base 70, rather than inside the strobe cavity, while the transmit pulse generating transistor is mounted within the transmit cavity.

The sheet inductance of the radar cavities couples the transmit pulse to the receiver, mostly through the ground plane. The differential input of the amplifier cancels out the ground plane noise. Also, the AC coupling on the receive antenna limits the amount of low frequency noise coupled into the receiver. The shielding provided by the transmit and receive cavities prevents direct coupling of the transmitter pulse into the receiver.

The waveguide launch type system implemented by the waveguide cavity shown in FIG. 2 can be improved using a horn or dielectric lens as described below providing gain for the receive signal and a narrow beam width.

Figure 3:
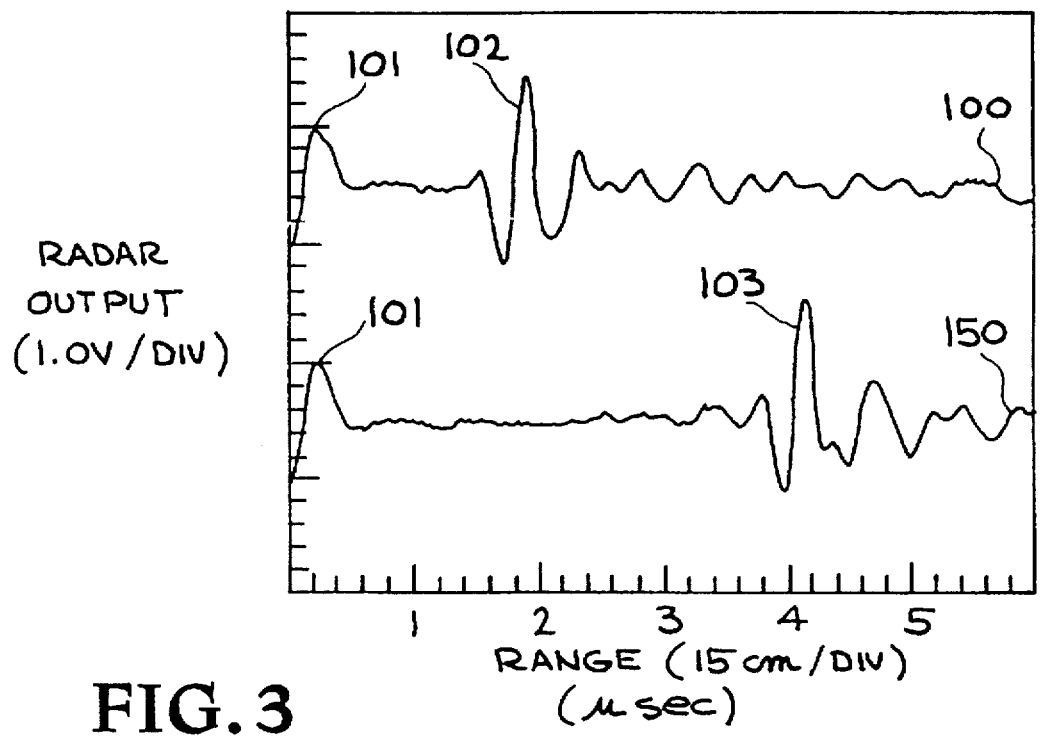
FIG. 3 shows echo returns generated by a radar according to the present invention.

FIG. 3 is a graph illustrating the signals generated using the radar of FIG. 2. The plot is of the sample signal on line 40 from FIG. 1. Two traces are illustrated, a first trace 100 showing the result of an echo at 30 cm and a second trace 150 showing the result of an echo at 60 cm. The signals include an initial pulse 101 which corresponds to the transmission of the transmit pulse. In the trace 100, a pulse 102 is generated from an object at about 30 cm. In trace 150, a pulse 103 is generated from an object at about 60 cm. As can be seen, in the region between the pulse 101 and the pulse 102, or the pulse 101 and the pulse 103, there is very little background noise. The detected echo has been measured, such that the background noise is about 30 dB lower than the strong return echo. Also, measurements indicate that jitter of the return echo signals is very low, on the order of 1 picosecond, or about 0.01 inches. Thus, the resolution of the sensor as configured is very fine.

The initial pulses 101 in the traces 100 and 150 at the extreme left are residuals from the transmit "main bang" occurring at less than 4 inches of range. Thereafter, slight ripples seen in the traces going out to the echo represent ringing and clutter that is about 30 dB lower than the echoes 102 and 103 seen at 30 cm and 60 cm. These residuals represent signals more than 10,000 times weaker than the transmit pulse occurring only a few nanoseconds earlier.

Figure 4A:
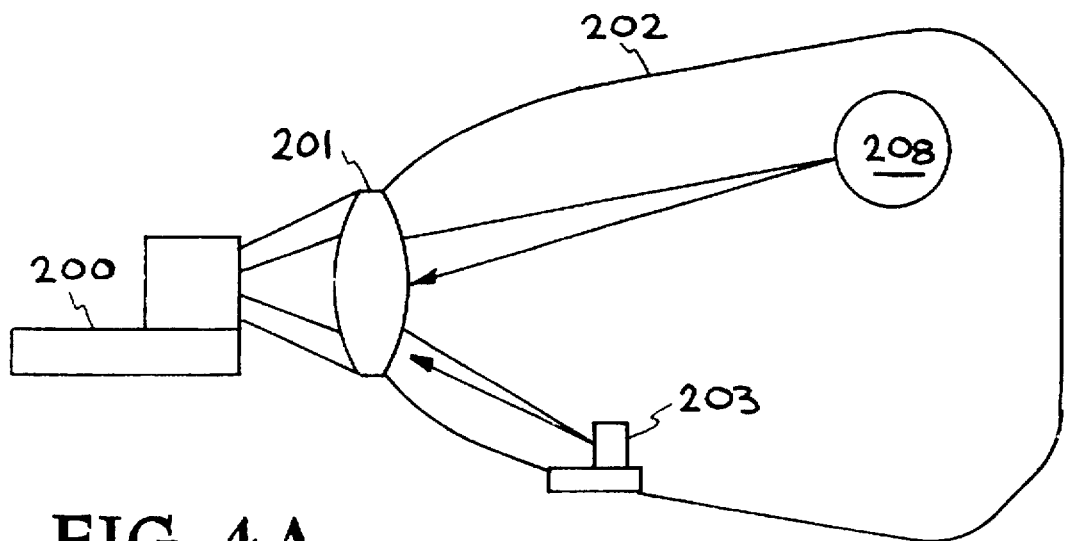
FIG. 4A is a schematic diagram illustrating use of a dielectric lens with the transmitter of the present invention.

FIG. 4A illustrates two features which may be included with the radar according to the present invention. In FIG. 4A, the radar is represented by the symbol 200. The radar emits a signal through a dielectric lens 201 which creates a directional lobe 202, improving the sensitivity and directional control of the radar.

Figure 4B:
FIG. 4B illustrates a sample signal.

Also, FIG. 4A illustrates use of a fiducial object 203 within the field of the radar 200. The fiducial object may be used with or without the dielectric lens 201 as suits a particular application. The purpose of the fiducial object is to provide precise calibration of the sample signal. Thus, a sample signal 204 is illustrated in FIG. 4B. It includes the initial bump 205, caused by the transmit pulse. An echo 206 is received from the fiducial object 203, and thereafter an echo 207 is received from the object 208 within the field 202 of the radar 200. Because the fiducial object 203 is at a known position relative to the transmitter on the radar 200, any drift in the components of the radar which might be reflected in the distance between the initial pulse 205, and the echo 207 from the object, will be cancelled. This provides a better indication of the distance of the object 208 from the radar 200.

Figure 5:
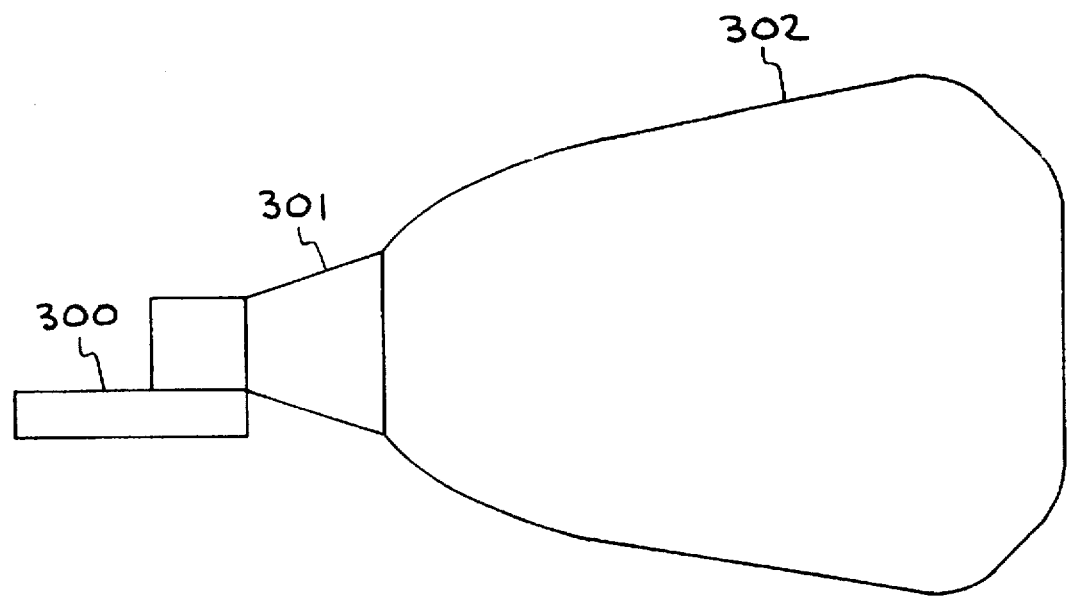
FIG. 5 is a schematic diagram illustrating use of an antenna horn with the transmitter of the present invention.

FIG. 5 illustrates yet another alternative configuration for the radar. In particular, FIG. 5 shows a radar 300 with an antenna horn 301 used for producing a direction lobe 302 for the radar. As will be appreciated by those in the art, the directional horn 301 is another way of improving the sensitivity of the radar, and controlling the directional characteristics of it.

The dielectric lens of FIG. 4A, and the directional horn of FIG. 5 are representative of a wide variety of modifications of the antenna and cavity structure which may be used to control the characteristics of the field within which the sensor operates.

Figure 6:
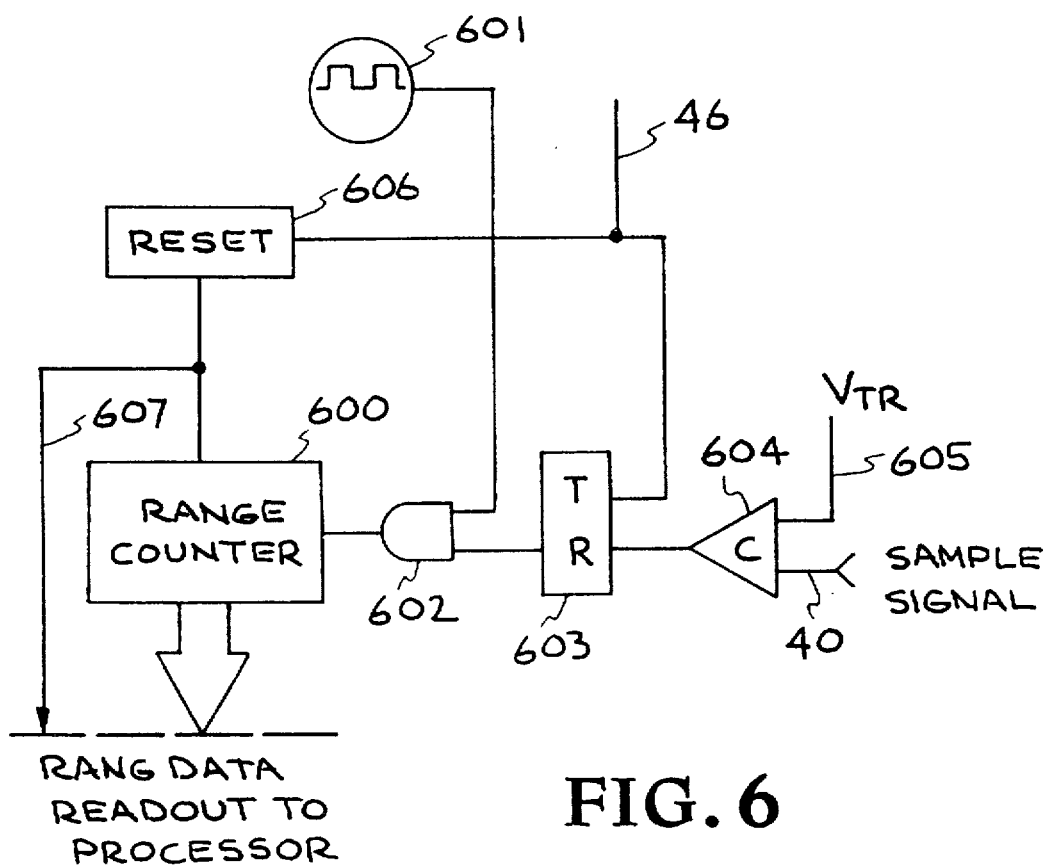
FIG. 6 shows portions of a signal processor for use with the present invention.

FIG. 6 illustrates one signal processing technique which may be used for detecting the distance of an object from the radar. In particular, the signal processor in this embodiment includes a range counter 600 which is driven by a 10 megaHertz clock 601. The 10 megaHertz clock 601 is enabled by gate 602. Gate 602 is turned on by the output of the binary element 603. The binary element is a flip-flop which is set by the 40 Hertz sweep generator sync signal on line 46, on each rising edge. It is reset by output of a comparator 604. The comparator 604 compares the sample signal from line 40 with a threshold voltage on line 605. Also, a reset controller 606 is signalled by the 40 Hertz signal on line 46 to reset the range counter 600, and supplies a reset signal on line 607 to a data processor which processes the data.

The system operates by enabling the range counter 600 at the beginning of each sweep in response to the 40 Hertz signal on line 46. When the sample signal on line 40 crosses the threshold, as indicated by the output of the comparator 604, the binary element 603 is reset, turning off the clock to the counter 600. The value of the counter 600 is then read out, the value indicating the time between the beginning of a range sweep and the receiving of an echo with a sufficient magnitude.

The accuracy of the range counter 600 is determined by the drift in the timing components, and the speed of the clock 601. With a 10 megaHertz clock, and a 40 Hertz range sweep, the granularity of the range counter 600 is 250,000 levels per sweep. This provides highly accurate range data, which can be utilized by a signal processing system to indicate a variety of characteristics of the object.

Also, the 40 Hertz signal on line 46 may be replaced by a similar threshold detector which is used to detect the initial pulse generated in the sample signal, such as the pulse 101, or a fiducial pulse, such as the pulse 206 using circuit techniques known in the art.

FIGS. 7A–7G provide an electrical schematic diagram for the radar circuitry implemented with the antenna structure shown in FIG. 2.

Figure 7A:
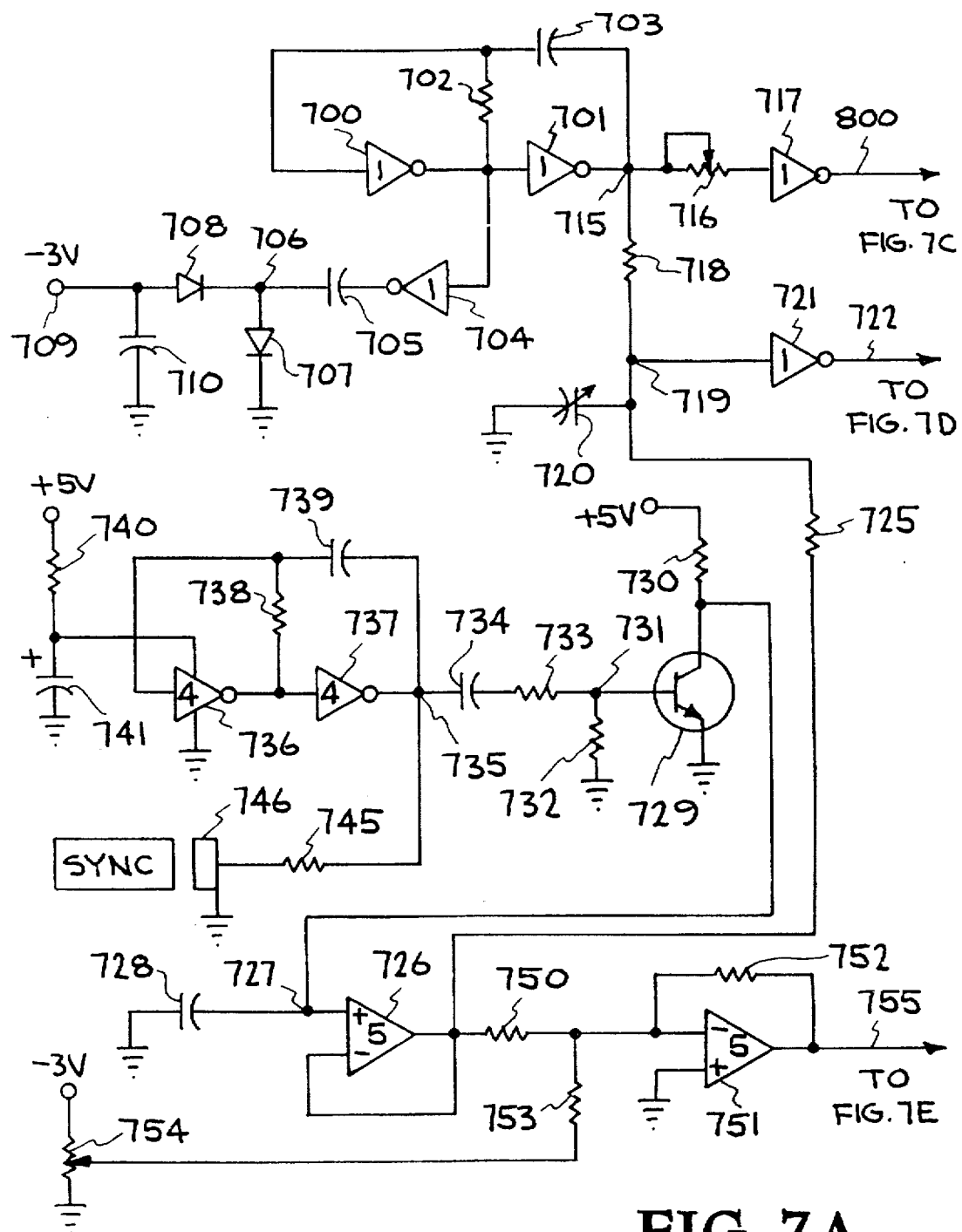
FIGS. 7A–7G provide an electrical schematic diagram of a radar according to the present invention.

FIG. 7A shows the 2 megaHertz pulse repetition frequency generator which is composed of inverter 700 in series with inverter 701. The output of inverter 700 is connected to the input of inverter 701. A resistor 702 is connected from the output of inverter 700 to its input. Also, a capacitor 703 is connected from the output of inverter 701 to the input of inverter 700.

Inverter 704 is connected from the output of inverter 700 to a charge pump including capacitor 705 coupled to node 706. The anode of diode 707 is connected to node 706, and its cathode is connected to ground. The anode of diode 708 is connected to a −3 volt supply node 709, and its cathode is connected to node 706. Capacitor 710 is coupled from ground to the −3 volt supply node 709.

The pulse repetition frequency generator supplies its output on node 715. Node 715 is driven through trim resistor 716 to inverter 717. The output of inverter 717 is supplied to the pulse shaping circuitry described with reference to FIG. 7C which will ultimately drive the pulse generator.

Also, node 715 is connected through resistor 718 to node 719. Node 719 is connected through a trim capacitor 720 to ground. Also, node 719 is the input of inverter 721 which supplies a signal on line 722 which drives the receive timing signal generator circuitry of FIG. 7D.

Node 719 receives an exponential ramp through resistor 725 from the output of op-amp 726. Op-amp 726 has its output connected to its inverting input, and its positive input connected to node 727. Node 727 is coupled through a Mylar capacitor 728 to ground, and to the collector of bipolar transistor 729. The collector of transistor 729 is also coupled through resistor 730 to a 5 volt supply. The emitter of transistor 729 is connected to ground. The base of transistor 729 is connected to node 731. Node 731 is connected through resistor 732 to ground, and through resistor 733 and capacitor 734 to node 735. Node 735 is the output of a 40 Hertz scan oscillator implemented by inverter 736 in series with inverter 737. Resistor 738 is connected from the output of inverter 736 to its input. Also, a Mylar capacitor 739 is connected from the output of inverter 737 to the input of inverter 736. The power supply on inverter 736 is fed by resistor 740 which is connected to a 5 volt supply. Also, a capacitor 741 is connected from the supply input of inverter 736 to ground.

Also, the output on node 735 of the 40 Hertz scan oscillator is supplied through resistor 745 to a sync output 746 which is used by the signal processor.

The signal on the output of op-amp 726 is an exponential ramp which is driven through resistor 725 to the input of inverter 721.

The threshold of inverter 721 establishes an exponential delay characteristic which balances the exponential ramp from op-amp 726 to provide a linear delay sweep for the signal on line 722.

The exponential ramp at the output of op-amp 726 is also connected through resistor 750 to the inverting input of op-amp 751. Op-amp 751 has resistor 752 connected from its output to its inverting input. The positive input of op-amp 751 is connected to ground. Also, the input of inverting op-amp 751 is connected through resistor 753 to a trim resistor 754 for trimming the gain of the STC. The output of op-amp 751 is connected on line 755 to the STC circuit of FIG. 7E.

Figure 7B:
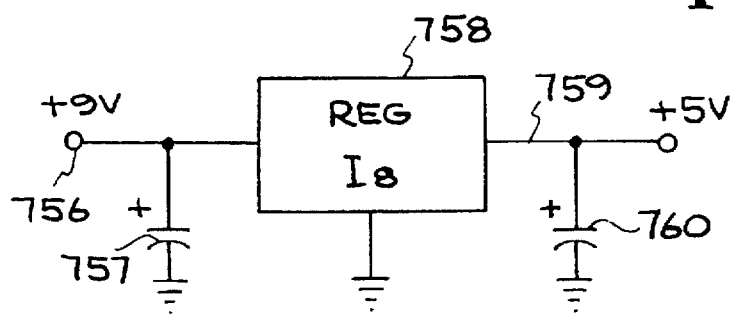

The power supply voltages in this system as shown in FIG. 7B are supplied from a 9 volt battery at input 756. A capacitor 757 is connected from node 756 to ground. A regulator 758 supplies a 5 volt output on line 759. Also, a capacitor 760 is connected from the output on line 759 of the regulator 758 to ground.

Figure 7C:
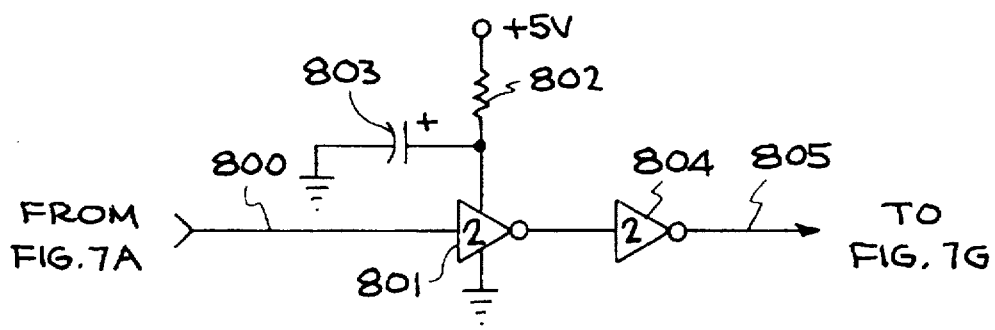
Figure 7D:
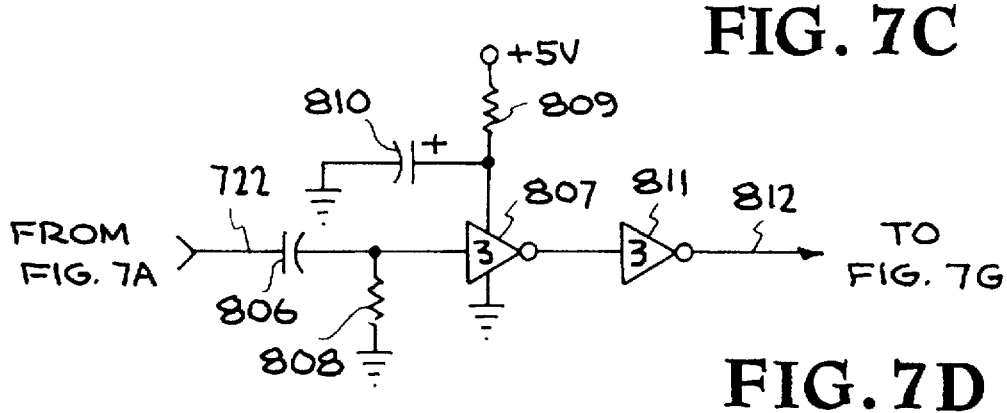

The signal from the output of inverter 717 of FIG. 7A is received on line 800 of FIG. 7C. It is supplied to the input of inverter 801. Inverter 801 has its supply input fed by resistor 802 from a 5 volt supply. A capacitor 803 is connected from the supply input of inverter 801 to ground. The output of the inverter 801 is connected to the input of inverter 804. The output of inverter 804 is connected on line 805 to the transmit pulse generator shown in FIG. 7F.

Also, from FIG. 7A, the signal on line 722 is connected through capacitor 806 to the input of inverter 807. Also, the input of inverter 807 is connected across resistor 808 to ground. The power supply input of inverter 807 is fed by resistor 809 coupled to the 5 volt supply. Capacitor 810 is connected from the supply input of inverter 807 to ground. The output of inverter 807 is connected to the input of inverter 811. The output of inverter 811 is supplied on line 812 to the receive pulse generating circuit in FIG. 7G.

Figure 7E:
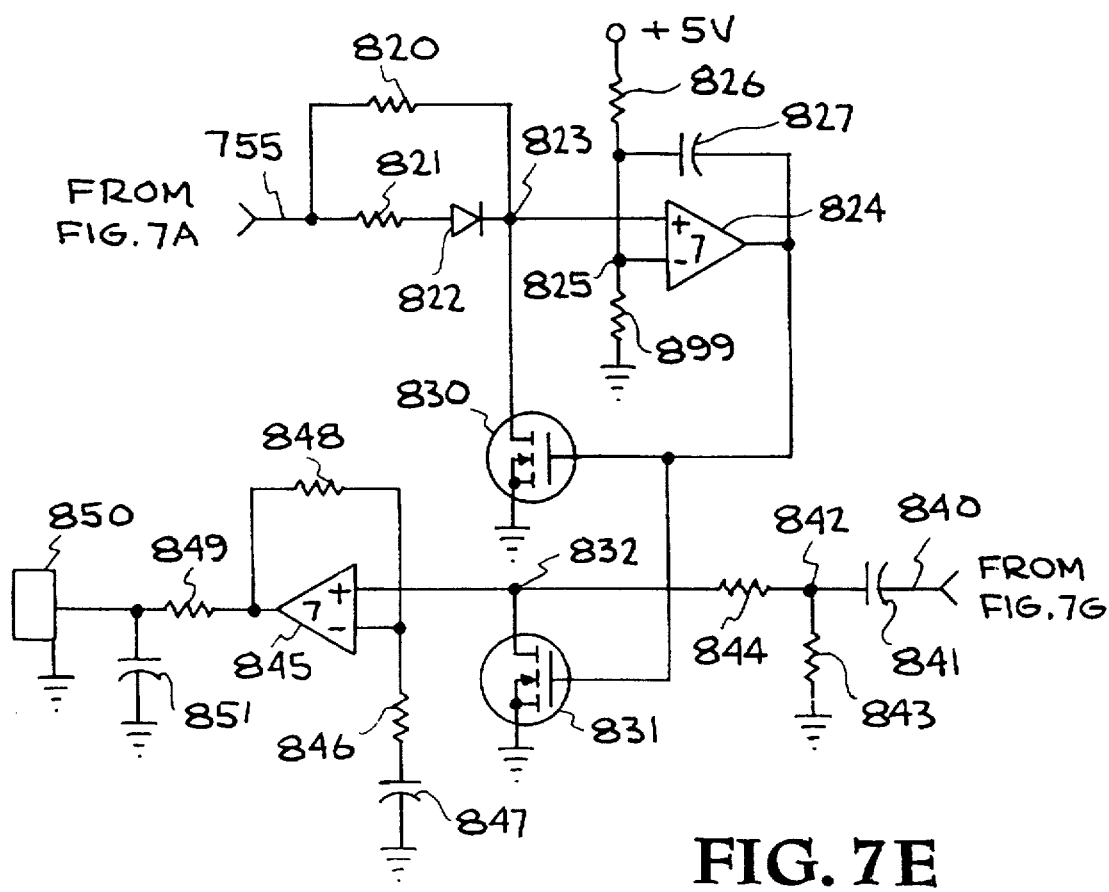

Also in FIG. 7E, the signal on line 755 from op-amp 751 is received through an STC model circuit composed of resistor 820 in parallel with the series connection of resistor 821 and diode 822. This circuitry provides a model of the sensitivity time characteristic to be compensated for by the STC circuit to provide increasing gain with increasing range. The output of the STC model is connected to node 823. Node 823 is connected to the positive input of op-amp 824. The inverting input is connected to node 825. Node 825 is connected through resistor 826 to the 5 volt supply, and through capacitor 827 to the output of the op-amp 824. Also, a resistor 899 is connected from node 825 to ground. The output of op-amp 824 is also connected to the gate of FET transistor 830. The drain of FET transistor 830 is connected to node 823. The source of FET transistor 830 is connected to ground. Similarly, the output of the op-amp 824 is connected to the gate of FET 831. The drain of FET 831 is connected to node 832. The source of FET 831 is connected to ground. The FET 831 provides controlled attenuation of the signal at the node 832 for the STC compensation.

Figure 7F:
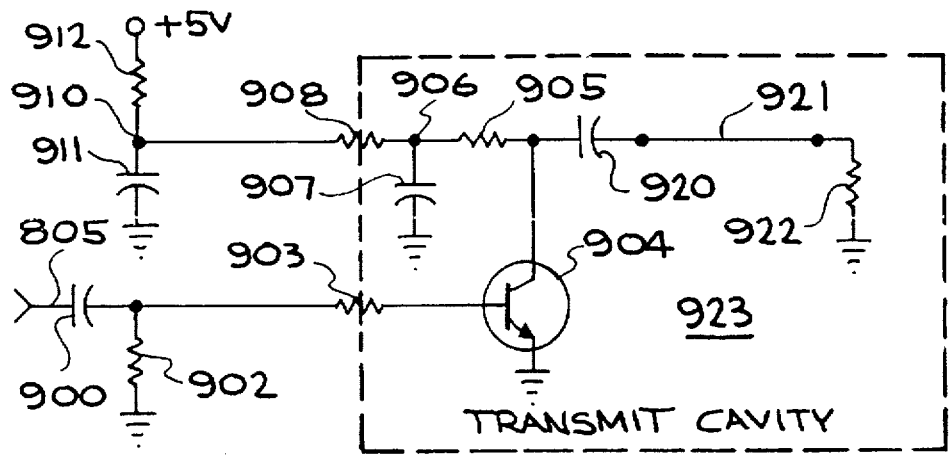
Figure 7G:
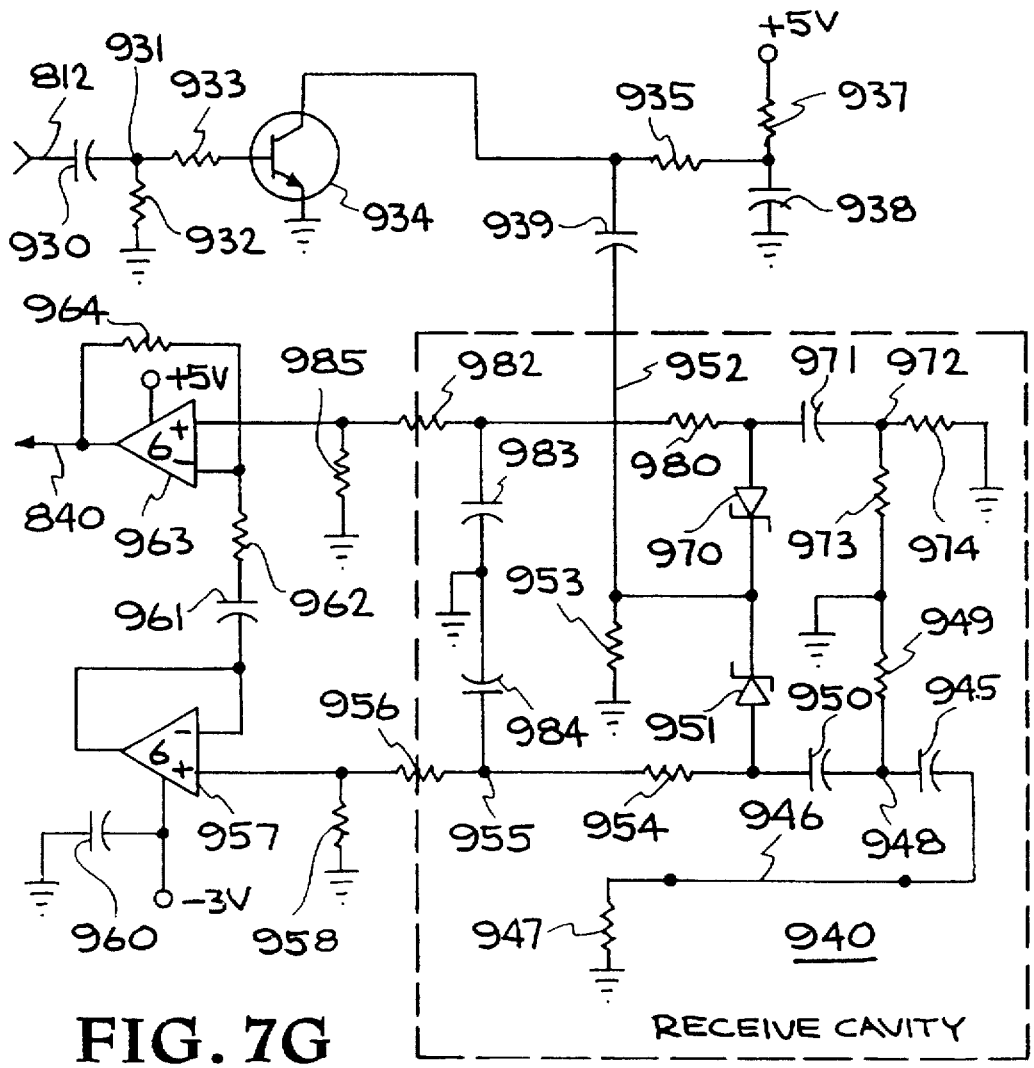

The output of the differential amplifier in the receiver is received on line 840 from the circuitry of FIG. 7G. It is supplied through capacitor 841 to node 842. Node 842 is connected through resistor 843 to ground, and through resistor 844 to node 832. Node 832 is connected to the positive input of op-amp 845. The inverting input of op-amp 845 is connected through resistor 846 in series with capacitor 847 to ground. Also, a resistor 848 is connected from the output of op-amp 845 to its inverting input. The output of the op-amp 845 is supplied through a resistor 849 to a video output 850. Capacitor 851 is also coupled between the video output 850 and ground. The video output 850 provides the equivalent time sample signal as described above.

FIGS. 7F and 7G illustrate the balance of the circuitry in the radar. The transmit timing clock on line 805 is coupled through a capacitor 900 to node 901. Node 901 is connected through resistor 902 to ground and through resistor 903 to the base of transistor 904. The emitter of transistor 904 is connected to ground. The collector of transistor 904 is connected through resistor 905 to node 906. Node 906 is connected through a capacitor 907 to ground and through a resistor 908 to node 910. Node 910 is connected through capacitor 911 to ground, and through resistor 912 to the 5 volt supply. Also, the collector of transistor 904 is AC coupled through capacitor 920 to the monopole antenna 921 which is resistively loaded by resistor 922. The resistively loaded monopole antenna is about 1¼ inches long in this embodiment. Also, the dashed lines 923 illustrate the components which are mounted within the transmit cavity.

The receive timing signal is received on line 812, and coupled through capacitor 930 to node 931. Node 931 is connected across resistor 932 to ground and through resistor 933 to the base of high speed bipolar transistor 934. The emitter of transistor 934 is connected to ground. The collector of transistor 934 is connected through resistor 935 to node 936. Node 936 is connected across resistor 937 to the 5 volt supply, and across capacitor 938 to ground. The collector of transistor 934 also supplies the gate pulse through capacitor 939 to strobe the sampling gates in the receive cavity. The receive cavity is outlined generally by dotted line 940.

A number of components are mounted within the receive cavity 940, including the resistively loaded monopole antenna, capacitor 945, antenna 946, and resistor 947. The antenna is connected from node 948 through resistor 949 to ground, and through a capacitor 950 to the anode of sampling diode 951. A cathode of diode 951 is connected to receive the receive strobe pulse from line 952 through the capacitor 939. Also, line 952 is connected through a resistor 953 to ground. The anode of diode 951 is connected through resistor 954 to node 955. Node 955 is connected across resistor 956 to the positive input of op-amp 957. Also, the positive input of op-amp 957 is connected across resistor 958 to ground. The negative power supply on op-amp 957 is coupled to the −3 volt supply (from FIG. 7A), and across capacitor 960 to ground. The output of op-amp 957 is connected to the inverting input, and through capacitor 961 and resistor 962 to the inverting input of op-amp 963. The inverting input of op-amp 963 is coupled through resistor 964 to its output. The positive power supply on the op-amp 963 is coupled to the 5 volt supply.

The positive input of op-amp 963 is driven through a second sample gate which is connected as follows. In particular, a sampling diode 970 has its cathode connected to line 952 to receive the gate pulse. The anode of diode 970 is connected through capacitor 971 to node 972. Node 972 is connected through resistor 973 to ground. Also, a trim resistor 974 may be included between node 972 and ground.

The anode of diode 970 is connected through resistor 980 and resistor 982 to the positive input of the op-amp 963. The node between resistor 980 and resistor 982 is connected through capacitor 983 to ground. There is a similar capacitor 984 connected between node 955 and ground. Resistor 985 is connected from the positive input of the op-amp 963 to ground.

In FIGS. 7A–7G, inverters 700, 701, 704, 717, 721, 736 and 737 may be implemented with 74HC04. The inverters 801, 804, 807 and 811 may be implemented with 74AC04. The op-amps 726, 751, 824, 845, 963, and 957 may be implemented using the component TLC272. The regulator 758 is implemented with a 812-50 manufactured by Seiko. The transistors 830 and 831 are on a CD4007, with pin 14 at 5 volts and pin 7 at ground. All the diodes are implemented with IN4148's unless noted in the figure. Transistors 904 and 934 are implemented using NE68533. Transistor 729 is implemented using a 2N2222. Component values listed in the figure are representative of one implementation. They may be adjusted to suit the needs of a particular application.

This circuitry provides a differential sampling structure with very high common mode rejection as discussed above. Alternative implementations of the differential receiver circuitry are described in U.S. Pat. No. 5,345,471 issued Sep. 6, 1994 entitled ULTRA-WIDE BAND RECEIVER, filed Apr. 12, 1993, application Ser. No. 08/044,745. This patent is incorporated by reference for the purpose of teaching alternative receiver technologies.

Accordingly, a highly accurate, low cost, simple to implement wide band radar sensor is provided with a swept range gate which provides an amplitude versus time sample signal making the radar useful as a radar range finder. The radar range finder of the present invention replaces ultrasound ranging sensors used in industry which suffer the variation in speed of sound over temperature and humidity, reflections off foam in vats giving false level measurements and the like, industrial environments generating ultrasonic interference, and the inability of ultrasound to penetrate panels, or a dirt or water overcoating blocking the transducer. All of these deficiencies are solved by the present invention, with a low cost, versatile, and highly accurate sensor.

Besides the fluid level measurement systems which have been primarily implemented with ultrasound in the prior art, the present invention has other immediate uses in automotive parking assistance and cruise control radar. Yet another use for this sensor is hidden object location, such as finding and precisely ranging between wall studs and pipes, rebar in concrete, weapons in briefcases or mattresses, and buried wires and pipes. The range finding applications also have many uses in the robotics field.

Although the embodiment described is based on a transmitter which issues a sequence of single impulse RF signals by the transmitter, a similar system can be implemented using a sequence of bursts of RF energy of several cycles in length. The impulse transmission embodiment may have limited applications because of Federal Communications Commission Part 15 regulations over the transmission methods allowed for wide band pulses.

Another application of the present invention is an educational one. In particular, time domain electromagnetics can be studied using this simple radar with an equivalent time output signal. A student may, in real time, monitor the characteristics of the field of the radar in a manner to be studied, and watch the results on the echoed pulses in the sample signal.

Thus, the present invention has provided a low cost, high accuracy radar with high resolution swept range gate for close range applications. The uses include automotive parking assistance, curb sensing, active suspension system sensing, occupant position sensing, and other applications where the precise range of an object needs to be determined. The range finder also makes an excellent fluids and solids level sensor for petroleum storage tanks, industrial mixing vats, and grain silos. Its amplitude scan display also indicates the presence or absence of objects behind barriers, such as studs behind walls and rebar in concrete. The device can also be used in medical applications to sense movement of organs such as the heart within the swept range.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for detecting a characteristic of objects within a field, comprising:
   a transmitter, including a shielded transmit cavity and a transmit antenna within the shielded transmit cavity, which transmits a sequence of electromagnetic pulses in response to a transmit timing signal;
   a receiver, including a shielded receive cavity adjacent to the transmit cavity and a receive antenna within the shielded receive cavity, and a differential sampler having a first input connected to the receive antenna and a second input connected to ground, which samples echoes from objects within the field of the sequence of electromagnetic pulses with controlled timing, in response to a receive timing signal, and generates a sample signal in response to the samples, the sample signal indicating a characteristic of objects within the field;
   a timing circuit which supplies the transmit timing signal to the transmitter and supplies the receive timing signal to the receiver, the receive timing signal causing the receiver to sample the echoes such that time between transmission of pulses in the sequence and sampling by the receiver sweeps over a range of delays.

2. The apparatus of claim 1, wherein the delays in the range of delays over which the timing circuit sweeps the time between transmission of pulses in the sequence and sampling by the receiver vary by less than 100 nanoseconds.

3. The apparatus of claim 2, wherein delays in the range of delays vary by less than 10 nanoseconds.

4. The apparatus of claim 1, wherein the transmit timing signal causes the transmitter to transmit the sequence of electromagnetic pulses at a consistent pulse repetition rate to define a time between pulses, and the time between pulses is greater than difference in the delays at the beginning and the end of the range of delays.

5. The apparatus of claim 1, wherein the transmit timing signal causes the transmitter to transmit the sequence of electromagnetic pulses at a pulse repetition rate, and wherein the receive timing signal sweeps over the range of delays in a sweep cycle such that echoes are sampled at the pulse repetition rate and with different delays in the range of delays, such that the sample signal represents received echoes in equivalent time.

6. The apparatus of claim 5, wherein the differential sampler for cancelling background noise is positioned in the shielded receive cavity.

7. The apparatus of claim 5, wherein the sweep cycle is repeated at a sweep rate of less than 16 kiloHertz.

8. The apparatus of claim 5, wherein the sweep cycle is repeated at a sweep rate of less than 100 Hertz.

9. The apparatus of claim 7, wherein the pulse repetition rate is greater than about 1 megaHertz.

10. The apparatus of claim 1, wherein the differential sampler comprises a first sampling gate having an output and an input coupled to the antenna, a second sampling gate having an output and an input coupled to ground, and a differential amplifier having a first input coupled to the first sampling gate output and a second input coupled to the second sampling gate output.

11. The apparatus of claim 1, wherein the transmit waveguide cavity, and the receive waveguide cavity are separated by a conductive wall to reduce main bang coupling.

12. The apparatus of claim 1, including a shielding base, and wherein the transmit waveguide cavity and the receive waveguide cavity are mounted on the shielding base.

13. The apparatus of claim 1, wherein the sequence of electromagnetic pulses comprises a plurality of bursts of electromagnetic energy having a nominal center frequency.

14. The apparatus of claim 1, wherein the sequence of electromagnetic pulses comprises a plurality of impulses of electromagnetic energy having a wide band frequency characteristic.

15. The apparatus of claim 1, wherein the transmit antenna is a resistively loaded monopole antenna mounted in the transmit waveguide cavity, and the receive antenna is a resistively loaded monopole antenna mounted in the receive waveguide cavity.

16. The apparatus of claim 15, wherein the transmitter includes a transmit pulse generator, and circuitry which AC couples the antenna mounted in the transmit waveguide to the transmit pulse generator.

17. The apparatus of claim 15, wherein the receiver waveguide and the transmit waveguide are coupled to a shared ground plane, the receiver includes circuitry which isolates the antenna mounted in the receive waveguide from low frequency residual currents in the receive waveguide.

18. The apparatus of claim 1, including a fiducial object in the field which produces an echo at a known position in the field for calibration of the sample signal.

19. The apparatus of claim 1, wherein the timing circuitry includes circuitry for dithering the pulse repetition rate to reduce interference from other electromagnetic sources in the field.

20. A swept range gate radar for detecting characteristics of objects within a field, comprising:

a transmitter, including a shielded transmit cavity and a transmit antenna within the shielded transmit cavity, which transmits a sequence of electromagnetic pulses from the transmit antenna into the field in response to a transmit timing signal;

a receiver, including a shielded receive cavity adjacent the transmit cavity and a receive antenna within the shielded receive cavity, which samples echoes from objects in the field of the sequence of electromagnetic pulses with controlled timing, in response to a receive timing signal, and generates a sample signal in response to the samples;

a timing circuit which supplies the transmit timing signal to the transmitter and supplies the receive timing signal to the receiver, the receive timing signal causing the receiver to sample the echoes such that time between transmission of pulses in the sequence by the transmitter and sampling by the receiver sweeps over a range of delays; and a signal processor, coupled with the receiver, to indicate a characteristic of the object in response to the sample signal.

21. The radar of claim 20, wherein the signal processor comprises a counter which counts at a count rate from a beginning of the sweep until the sample signal reaches a threshold, and generates a counter output indicating a position of a source of an echo in the field.

22. The radar of claim 20, wherein the timing circuit includes a voltage controlled delay circuit having a control input, and a voltage ramp generator coupled to the control input of the voltage controlled delay circuit to sweep the receive timing signal.

23. The radar of claim 22, wherein the voltage ramp generator comprises a digital to analog converter.

24. The radar of claim 22, wherein the voltage ramp generator comprises an analog exponential ramp generator, and the voltage controlled delay circuit produces a delay which is an exponential function of voltage on the control input.

25. The radar of claim 20, wherein the transmit timing signal causes the transmitter to transmit the sequence of electromagnetic pulses at a pulse repetition rate, and wherein the receive timing signal sweeps over the range of delays in a sweep cycle such that echoes are sampled at the pulse repetition rate and with different delays in the range of delays, such that the sample signal represents the received echoes in equivalent time.

26. The radar of claim 25, wherein the sweep cycle is repeated at a sweep rate of less than about 16 kiloHertz.

27. The radar of claim 25, wherein the sweep cycle is repeated at a sweep rate of less than 100 Hertz.

28. The radar of claim 26, wherein the pulse repetition rate is greater than about 1 megaHertz.

29. The radar of claim 20, wherein the receiver includes a first sampling gate coupled to the receive antenna, a second sampling gate coupled to ground and a differential amplifier having a first input coupled to the first sampling gate and a second input coupled to the second sampling gate.

30. The radar of claim 29, including a shielding base, and wherein the shielded transmit cavity and the shielded receive cavity are mounted on the shielding base.

31. The radar of claim 20, wherein the sequence of electromagnetic pulses comprises a plurality of bursts of electromagnetic energy having a nominal center frequency.

32. The radar of claim 30, wherein the sequence of electromagnetic pulses comprises a plurality of impulses of electromagnetic energy having a wide band frequency characteristic.

33. The radar of claim 20, wherein the transmit antenna comprises a resistively loaded monopole antenna, and the receive antenna comprises a resistively loaded monopole antenna.

34. The radar of claim 33, wherein the transmitter includes a transmit pulse generator, and circuitry which AC couples the transmit antenna mounted in the shielded transmit cavity to the transmit pulse generator.

35. The radar of claim 33, wherein the shielded receive cavity and the shielded transmit cavity are coupled to a shared ground plane, the receiver includes circuitry which isolates the receive antenna from low frequency residual currents in the shielded receive cavity.

36. The radar of claim 20, including a fiducial object in the field which produces an echo at a known position in the field for calibration of the sample signal.

37. The radar of claim 30, wherein the timing circuitry includes circuitry for dithering the transmit timing signal to reduce interference from other electromagnetic sources in the field.

38. A swept range gate radar for detecting characteristics of objects within a range of less than 20 feet, comprising:

a transmitter, including a shielded transmit cavity and a resistively loaded transmit antenna within the shielded transmit cavity, which transmits a sequence of radio frequency (RF) pulses from the transmit antenna into the field in response to a transmit timing signal having a transmit pulse repetition rate of greater than 1 megaHertz;

a receiver, including a shielded receive cavity, a resistively loaded receive antenna within the shielded receive cavity, a first sampling gate coupled to the receive antenna, a second sampling gate coupled to ground and a differential amplifier having a first input coupled to the first sampling gate and a second input coupled to the second sampling gate, which samples echoes from objects in the field of the sequence of RF pulses with controlled timing in the first and second sampling gates, in response to a receive timing signal, and generates a sample signal in response to the samples;

a timing circuit which supplies the transmit timing signal to the transmitter and supplies the receive timing signal to the receiver, the receive timing signal causing the receiver to sample the echoes such that time between transmission of pulses in the sequence by the transmitter and sampling by the receiver sweeps over a range of delays in a sweep cycle such that echoes are sampled at the pulse repetition rate and with different delays in the range of delays, such that the sample signal represents the received echoes in equivalent time; and a signal processor, coupled with the receiver, to indicate a characteristic of objects in the range in response to the sample signal.

39. The radar of claim 38, wherein the signal processor comprises a counter which counts at a count rate from a beginning of the sweep until the sample signal reaches a threshold, and generates a counter output indicating a position of a source of an echo in the field.

40. The radar of claim 38, wherein the timing circuit includes a voltage controlled delay circuit having a control input, and a voltage ramp generator coupled to the control input of the voltage controlled delay circuit to sweep the receive timing signal.

41. The radar of claim 40, wherein the voltage ramp generator comprises a digital to analog converter.

42. The radar of claim 40, wherein the voltage ramp generator comprises an analog exponential ramp generator, and the voltage controlled delay circuit produces a delay which is an exponential function of voltage on the control input.

43. The radar of claim 42, wherein the sweep cycle is repeated at a sweep rate of less than about 16 kiloHertz.

44. The radar of claim 42, wherein the sweep cycle is repeated at a sweep rate of less than 100 Hertz.

45. The radar of claim 38, including a shielding base, and wherein the shielded transmit cavity and the shielded receive cavity are mounted on the shielding base.

46. The radar of claim 38, wherein the sequence of RF pulses comprises a plurality of bursts of RF energy having a nominal center frequency.

47. The radar of claim 38, wherein the sequence of RF pulses comprises a plurality of impulses of RF energy having a wide band frequency characteristic.

48. The radar of claim 38, wherein the transmit antenna comprises a resistively loaded monopole antenna, and the receive antenna comprises a resistively loaded monopole antenna.

49. The radar of claim 48, wherein the transmitter includes a transmit pulse generator, and circuitry which AC couples the transmit antenna mounted in the shielded transmit cavity to the transmit pulse generator.

50. The radar of claim 38, wherein the shielded receive cavity and the shielded transmit cavity are coupled to a shared ground plane, the receiver includes circuitry which isolates the receive antenna from low frequency residual currents in the shielded receive cavity.

51. The radar of claim 38, including a fiducial object in the field which produces an echo at a known position in the field for calibration of the sample signal.

52. The radar of claim 38, wherein the timing circuitry includes circuitry for dithering the pulse repetition rate to reduce interference from other electromagnetic sources in the field.

53. A method for detecting a characteristic of an object within a field, comprising:

generating a transmit timing signal;

switching a transistor coupled to an antenna to produce the sequence of pulses, the transistor switches an output node coupled to the antenna less than 9 volts in amplitude, and in less than one nanosecond on the antenna in response to the transmit timing signal, to transmit a sequence of electromagnetic pulses to the field with controlled timing at a pulse repetition rate;

generating a receive timing signal;

switching a transistor coupled to a sample gate in response to the receive timing signal, the transistor switching an output coupled to the sampling gate less than 9 volts in amplitude, and in less than one nanosecond on the sample gate in response to the receive timing signal, to sample echoes of the sequence of electromagnetic pulses after reflection by the object to produce samples with controlled timing, so that time between the transmitting of pulses in the sequence and the sampling of echoes sweeps repeatedly over a range of delays; and producing a signal in response to an accumulation of the samples in a capacitance during the range of delays, indicating the characteristic of the object.

54. The method of claim 53, including in the step of switching a transistor coupled to an antenna to produce the sequence of pulses, biasing the transistor for non-avalanche switching in response to the transmit timing signal.

55. The method of claim 53, including in the step of switching a transistor coupled to a sample gate to produce the sequence of pulses, biasing the transistor for non-avalanche switching in response to the receive timing signal.

56. The method of claim 53, including dithering the transmit timing signal and the receive timing signal.

57. An apparatus for detecting a characteristic of objects within a field, comprising:

a transmitter which transmits a sequence of electromagnetic pulses in response to a transmit timing signal, the transmitter including a transistor coupled to the antenna, the transistor biased in a non-avalanche switching region, and supplying transmit pulses to the antenna;

a receiver which samples echoes from objects within the field of the sequence of electromagnetic pulses with controlled timing, in response to a receive timing signal, and generates a sample signal in response to an accumulation of the samples, the sample signal indicating a characteristic of objects within the field, and a timing circuit which supplies the transmit timing signal to the transmitter and supplies the receive timing signal to the receiver, to cause the receiver to sample the echoes such that time between transmission of pulses in the sequence and sampling by the receiver sweeps over a range of delays.

58. The apparatus of claim 57, including circuitry for dithering the transmit timing signal and the receive timing signal rate to reduce interference from other electromagnetic sources in the field.

59. The apparatus of claim 57, wherein the transistor coupled to the antenna has a switching speed of about 0.1 nanoseconds.

60. The apparatus of claim 57, wherein the receiver includes:

a sample diode coupled to an antenna adapted to receive echoes, the sample diode also coupled to receive the receive timing signal;

a sample holding capacitor coupled between the diode and a reference voltage which accumulates a plurality of samples over time; and an amplifier, coupled to the sample holding capacitor.

61. The apparatus of claim 57, wherein the delays in the range of delays over which the timing circuit sweeps the time between transmission of pulses in the sequence and sampling by the receiver vary by less than 100 nanoseconds.

62. The apparatus of claim 61, wherein delays in the range of delays vary by less than 10 nanoseconds.

63. The apparatus of claim 57, wherein the transmit timing signal causes the transmitter to transmit the sequence of electromagnetic pulses at a consistent pulse repetition rate to define a time between pulses, and the time between pulses is greater than difference in the delays at the beginning and the end of the range of delays.

64. The apparatus of claim 57, wherein the transmit timing signal causes the transmitter to transmit the sequence of electromagnetic pulses at a pulse repetition rate, and wherein the receive timing signal sweeps over the range of delays in a sweep cycle such that echoes are sampled at the pulse repetition rate and with different delays in the range of delays, such that the sample signal represents received echoes in equivalent time.

65. The apparatus of claim 64, wherein the receiver includes a differential sampler canceling background noise.

66. The apparatus of claim 64, wherein the sweep cycle is repeated at a sweep rate of less than 16 kilohertz.

67. The apparatus of claim 64, wherein the sweep cycle is repeated at a sweep rate of less than 100 Hertz.

68. The apparatus of claim 67, wherein the pulse repetition rate is greater than about 1 megahertz.

69. The apparatus of claim 57, wherein the receiver includes an antenna, a first sampling gate having an output and an input coupled to the antenna, a second sampling gate having an output and an input coupled to the antenna, and a differential amplifier having a first input coupled to the first sampling gate output and a second input coupled to the second sampling gate output.

70. The apparatus of claim 69, wherein the first and second sampling gates include respective diodes connected between the antenna and the timing circuit to receive the echoes from the antenna and the receive timing signal from the timing circuit, and respective sample holding capacitors coupled between the antenna and a reference potential.

71. The apparatus of claim 57, wherein the sequence of electromagnetic pulses comprises a plurality of bursts of electromagnetic energy having a nominal center frequency.

72. The apparatus of claim 57, wherein the sequence of electromagnetic pulses comprises a plurality of impulses of electromagnetic energy having a wide band frequency characteristic.

73. The apparatus of claim 57, wherein the transmitter includes a resistively loaded monopole antenna mounted in a transmit waveguide cavity, and the receiver includes a resistively loaded monopole antenna mounted in a receive waveguide cavity.

74. The apparatus of claim 73, wherein the receiver waveguide and the transmit waveguide are coupled to a shared ground plane, the receiver includes circuitry which isolates the antenna mounted in the receive waveguide from low frequency residual currents in the receive waveguide.

75. The apparatus of claim 57, including a fiducial object in the field which produces an echo at a known position in the field for calibration of the sample signal.

76. The apparatus of claim 57, wherein the timing circuitry includes circuitry for dithering the pulse repetition rate to reduce interference from other electromagnetic sources in the field.

* * * * *